United States Patent [19]

Ogasawara et al.

[11] Patent Number: 4,472,743
[45] Date of Patent: Sep. 18, 1984

[54] AUTOMATIC DIAPHRAGM CONTROL DEVICE FOR A CLOSED CIRCUIT TELEVISION CAMERA

[75] Inventors: Terumi Ogasawara; Masayuki Arai, both of Tokyo, Japan

[73] Assignee: Asahi Seimitsu Kabushiki Kaisha, Tokyo, Japan

[21] Appl. No.: 365,097

[22] Filed: Apr. 2, 1982

[30] Foreign Application Priority Data

Sep. 22, 1981 [JP] Japan .............................. 56-149816

[51] Int. Cl.$^3$ ............................................. H04N 5/26
[52] U.S. Cl. ............................................. 358/228
[58] Field of Search ........................................ 358/228

[56] References Cited

U.S. PATENT DOCUMENTS 4,050,085 9/1977 Prince et al. ....................... 358/228

Primary Examiner—Richard Murray
Attorney, Agent, or Firm—Birch, Stewart, Kolasch & Birch

[57] ABSTRACT

A diaphragm control for a video camera is disclosed and controls the camera diaphragm in response to the camera video output. The video output signal is inverted by an inverting amplifier and is selectively voltage doubled to vary the weight of the light portions of the signal with respect to its dark portions. The selectively voltage doubled signal is averaged to a D.C. voltage and is compared to a reference exposure voltage. The reference exposure voltage is automatically varied to compensate for level variations in the voltage doubled signal caused by the selective doubling.

16 Claims, 10 Drawing Figures

FIG. 5
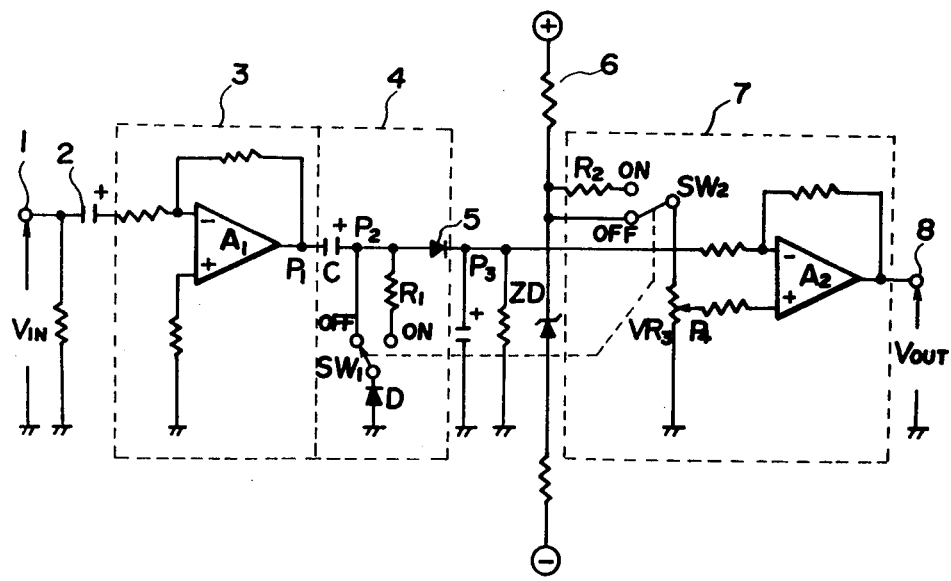
FIG. 7
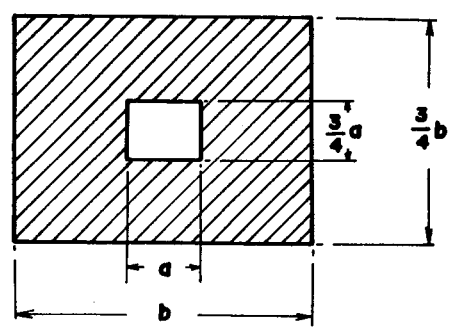
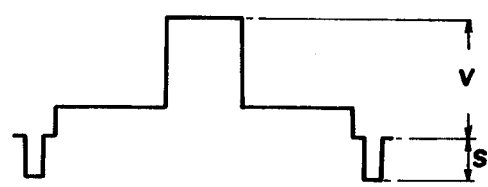

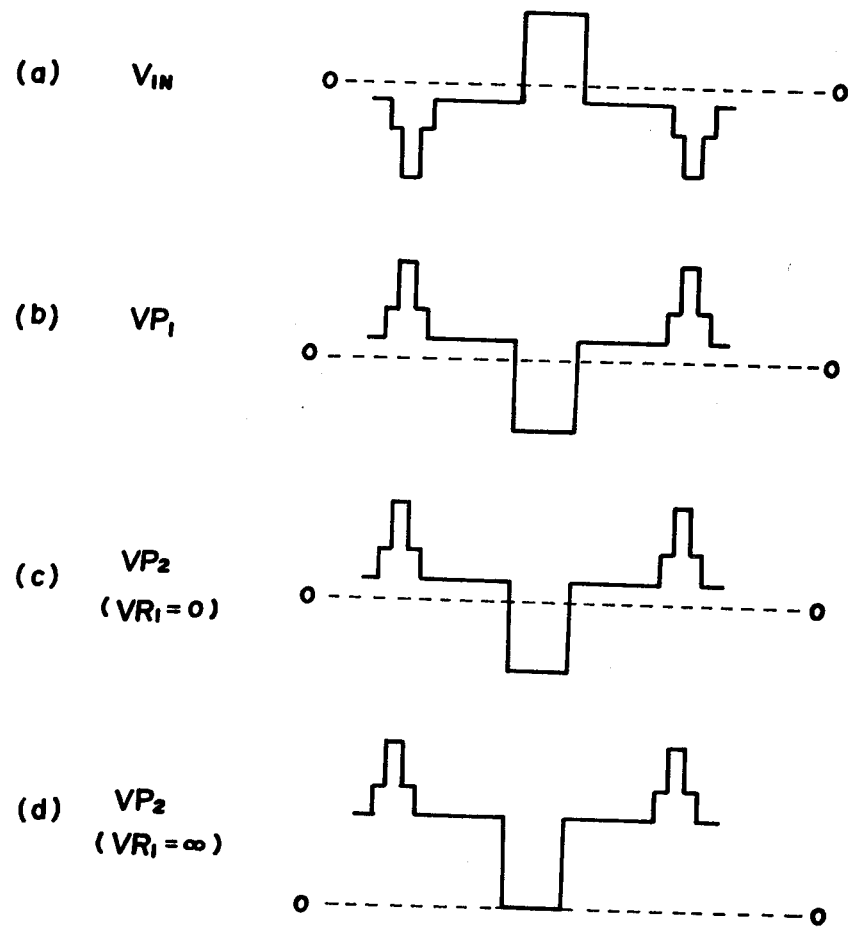

AUTOMATIC DIAPHRAGM CONTROL DEVICE FOR A CLOSED CIRCUIT TELEVISION CAMERA

FIELD OF THE INVENTION

The present invention relates to an automatic diaphragm control device for acting as a metering system for a closed circuit television camera utilizing a video output signal from the television camera.

BACKGROUND OF THE INVENTION

Automatic diaphragm control according to the teachings of the present invention uses a DC voltage obtained from rectification of the video output signal as a control signal to form the optimum picture. A rectifier used to detect the light intensity of the object for pickup is the most important element of the control, since the light measuring mode of the diaphragm control is determined by this rectifier.

In addition to the absolute brightness of the light intensity of the object for pickup, the ratio between the brightest portion of the object to be monitored by the video signal and the darkest portion of the object, known as the contrast ratio of this object, is also one of the important factors which must be considered in order to obtain the optimum picture. In the natural world, the contrast ratio reaches a level as high as 10 to 1 even under a cloudy sky and often reaches 100 to 1 under a blue sky. In a television-reproduced picture, on the contrary, the contrast ratio is limited to an order of 30 or 40 to 1. Accordingly, it must be decided whether the bright portion or the dark portion should be used as the main object to be monitored for the measurement of light intensity when an object, in general, simultaneously contains both the bright portion and the dark portion, since it is impossible to accurately measure or reproduce both portions at once.

Theoretically, the light measuring mode most suitable for the case where the darkest portion of the object is light-measured may be referred to as the average light measuring mode while the light measuring mode most suitable for the case where the brightest portion of the object to be monitored is light-measured may be referred to as the peak light measuring mode. As both light measuring modes rely upon the video ouput signal from the television camera for diaphragm control, the two types of light measuring modes as mentioned above have already been proposed. However, both of these well known modes still have problems. Specifically, when the same object to be reproduced as a video signal simultaneously contains both the brightest portion and the darkest portion of the picture as previously described, the average light measuring mode will often make the brighest portion reproduce as a white solid portion without a contrast gradient while the peak light measuring mode will often make the darkest portion, which should be normally discriminable by the camera, indiscriminable. As a consequence, the object to be used for metering must be selected after a careful examination of various factors of a particular object, such as absolute brightness and contrast, so far as the conventional video camera metering device of fixed photometric mode type is concerned.

SUMMARY OF THE INVENTION

Accordingly, it is an object of the invention to produce an improved automatic diaphragm control device for a closed circuit television camera.

It is another object of the present invention to produce an automatic diaphragm control for closed circuit television cameras wherein the weighting of light and dark portions of the picture being monitored may be controlled by shifting between alternate measurement modes.

It is a further object of the present invention to produce an automatic diaphragm control wherein the light intensity reference level may be varied, if necessary, to compensate for changes in measurement mode.

It is a still further object of the present invention to produce a compromise measurement mode which may be used in a relatively high contrast environment and without the need to vary the light intensity reference level.

To achieve the above-mentioned objects in accordance with the teachings of the present invention, the automatic diaphragm control device for a closed circuit television camera applies a video output signal from the television camera to a polarity-inverting amplifier, then rectifies the signal with a voltage doubling rectifier. The DC voltage thereby obtained is then compared with a separately provided reference voltage to form a diaphragm control signal, wherein a voltage with which a capacitor is charged for voltage doubling within said rectifier is controlled so that a desired compromise of the light measuring mode may be achieved between the average light measuring mode and the peak light measuring mode and so that the light intensity reference voltage level VP4 may be substantially maintained constant when said changeover of the light measuring mode is made in a high contrast condition as in the natural world.

BRIEF DESCRIPTION OF DRAWING

The present invention will become more fully understood from the detailed description given hereinbelow and the accompanying drawings which are given by way of illustration only, and thus are not limitative of the present invention and wherein:

FIGS. 1 through 5 are circuit diagrams illustrating embodiments of the present invention, respectively;

FIG. 6 is a diagram illustrating a relationship between the input signal and its associated output signal waveform at each circuit stage;

FIG. 7 is a diagram illustrating the relationship between an object for pickup and the corresponding video output signal waveform according to the teachings of the present invention;

DESCRIPTION OF THE PREFERRED EMBODIMENTS

Figure 8A:
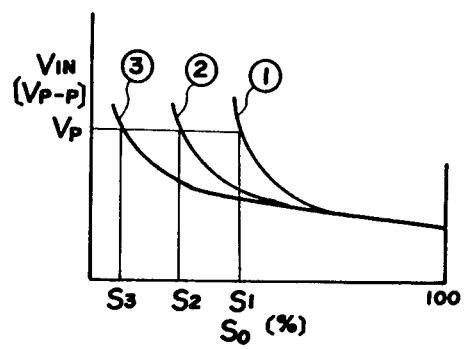
FIG. 8a is a diagram illustrating the relationship between the average light and contrast in the average light measuring mode.
Figure 8B:
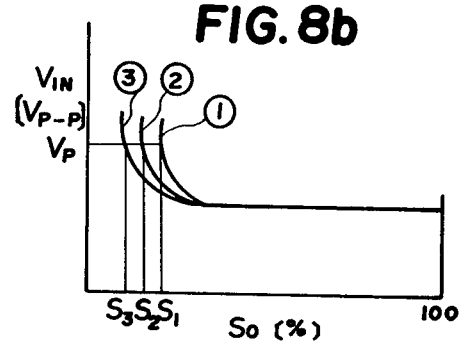
FIG. 8b is a diagram illustrating a relationship between peak light and contrast in the peak light measuring mode.

FIG. 7 is a diagram illustrating an object to be monitored and reproduced used as test object when the light measuring mode is examined, and the objects corresponding video output signal waveform. FIGS. 8a and 8b are diagrams showing curves representing possible relationships between the video output signal $V_{IN}$ of FIG. 7 and the area ratio $S_o$. In FIG. 7, V designates the video output signal and S designates the synchronizing signal. The term "area ratio" used herein means a ratio between the bright portion of the picture and the overall picture and is expressed by a following formula.

$$S_o = (a/b)^2 \times 100 [\%]$$

where a is the size of the bright area; and b is the overall picture size.

It will be obvious from reviewing FIGS. 8a and 8b how the characteristic curves of these figures vary depending upon the contrast. FIG. 8a relates to the case of average light measuring mode while FIG. 8b relates to the case of peak light measuring mode. In FIGS. 8a and 8b, reference numeral (1) indicates a case of high contrast, (3) indicates a case of low contrast and (2) indicates a case of intermediate contrast relative to the previous two cases (1) and (3). It will be seen from these figures that the average light measuring mode is remarkably influenced by the contrast ratio while the peak light measuring mode is only slightly influenced by the contrast ratio. It will also be seen that, in the case (3) of low contrast, the characteristic curves both extend over a range beginning from a point corresponding to the smallest value (S$_3$) of the area ratio $S_o$ relative to the video output signal $V_{IN}$ which usually serves as a reference for the selection of the appropriate mode both in the case of average light measuring mode and in the case of peak light measuring mode, so that both the modes can be utilized over a considerably large coextensive range as far as the case of low contrast is concerned.

Figure 9:
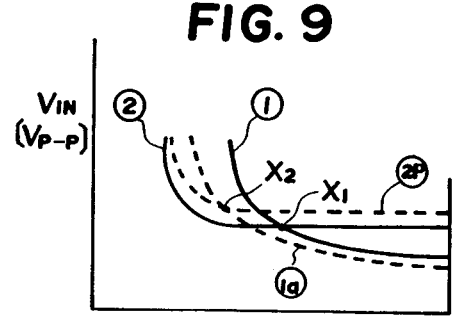
FIG. 9 is a diagram illustrating different photometric characteristics of the respective modes with respect to a variation in the reference voltage level.

FIG. 9 shows curves characterizing the respective light measuring modes in the case of high contrast, in which the curve (1) corresponds to the average light measuring mode and the curve (2) corresponds to the peak light measuring mode. In FIG. 9, the respective video output signals are shown as deviating from one another at the position corresponding to the area ratio of 100% because the reference level of the video output signal has been set using the Test Chart prepared according to the standard of Electronics Industries Association of Japan (EIAJ). Certainly the EIAJ Test Chart has more or less contrast, but the area ratio of 100% represents, as previously mentioned, the state in which overall the picture is evenly bright with the contrast equal to 0. The difference between the two curves is due to a difference of contrast produced by different reference levels prepared according to the EIAJ Test Chart.

FIG. 9 shows that the average light measuring mode curve (1) shifts towards the peak light measuring mode curve as plotted by the broken line (1a), as the reference voltage level is lowered with respect to an object of high contrast, while the peak light measuring mode curve (2) shifts towards the average light measuring mode as plotted by the broken line (2P), as the reference voltage level is raised similarly with respect to said object of high contrast.

Considering the characteristics that have been described above, the present invention proposes an arrangement which, when desired, is able to change a given initial light measuring condition towards either the average light measuring mode while lowering the reference voltage in response to a lowered DC voltage after rectification or, when desired, to change said initial light measuring condition towards the peak light measuring mode while raising the reference voltage so that the reference voltage level will not substantially vary at the moment of changeover between the average light measuring mode and the peak light measuring mode.

Figure 1:
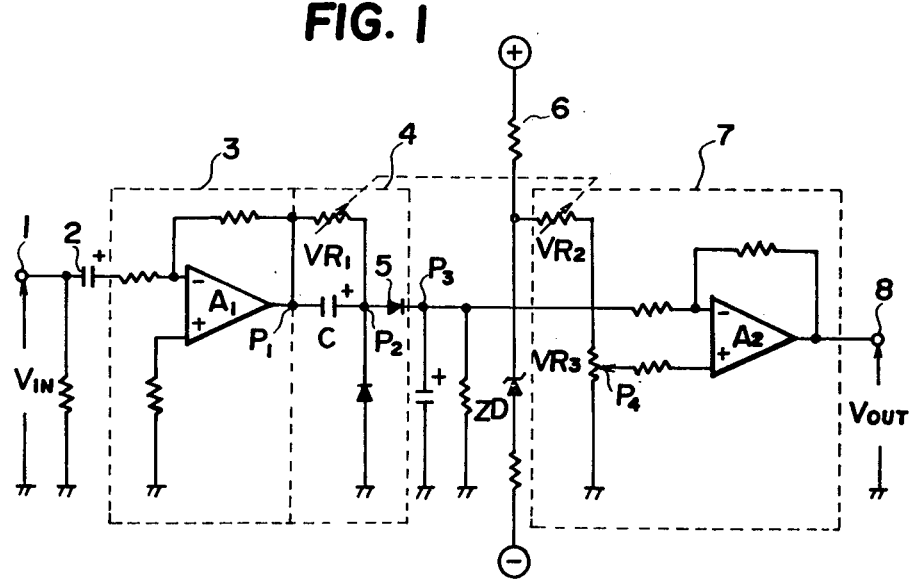

FIG. 1 is a circuit diagram schematically illustrating an embodiment of the present invention, in which reference numeral 1 designates an input terminal for receiving an input signal $V_{IN}$ corresponding to a video output signal coming from a television camera. This input terminal 1 is connected via a capacitor 2 to a polarity-inverting amplifier 3 including an operational amplifier A$_1$ so that an inverted and amplified signal VP$_1$ free from a DC component may be obtained at its output terminal P$_1$. A voltage doubling rectifier 4 for voltage doubling including a capacitor C and a diode D, the latter being serially connected to ground, is connected to the ouput terminal P$_1$ so that an output signal VP$_2$ is obtained at a point P$_2$. This output signal VP$_2$ is then rectified by a diode 5 which provides a DC voltage VP$_3$ at its output terminal P$_3$. The DC voltage VP$_3$ appearing at the output terminal P$_3$ is compared in a comparator 7 including an operational amplifier A$_2$ with a reference voltage VP$_4$ from a separately provided reference voltage circuit 6 to form a diaphragm control signal $V_{out}$ at an output terminal 8 as a result of this comparison. The reference voltage circuit 6 applies at a point P$_4$ a voltage substantially stabilized by a Zener diode ZD as said reference voltage VP$_4$. In this embodiment illustrated by FIG. 1, a variable resistance VR$_1$ is connected in parallel to the capacitor C for voltage doubling by the voltage doubling rectifier 4 to adjust the voltage with which said capacitor C is charged.

In the embodiment of the present invention, it is assumed now that the input signal $V_{IN}$ of a waveform as illustrated by FIG. 6a corresponding to the test object of FIG. 7 is applied to the input terminal 1 as the video output signal. A rectangular portion extending at the plus side of this waveform corresponds to the bright portion of the picture. The input signal $V_{IN}$ is inverted and amplified by the polarity-inverting amplifier 3 as shown by FIG. 6b to form the signal VP$_1$ appearing at the output terminal P$_1$. This signal VP$_1$ contains no net DC component due to action of the capacitor 2 and thus the signal exhibits a stabilized state in which the positive area is equal to the negative area with respect to the line 0—0 in FIG. 6b. Assuming that the value of the variable resistance is adjusted to 0, the signal VP$_2$ appearing at the point P$_2$ on the output side of the voltage doubling capacitor C will be identical to the signal VP$_1$ appearing at said point P$_1$ as seen in FIG. 6c. This means that the base line 0—0 displaces as the amplitude varies as long as the width of the waveform corresponding to the bright portion remains sufficiently large. The influence of the variation in the amplitude of the bright portion on the displacement of the base line 0—0 becomes more and more negligible as the width of the bright portion is reduced so that the DC voltage VP$_3$ at the point P$_3$ after rectification is maintained constant. More specifically, with the value of the variable resistance VR$_1$ adjusted to zero, the DC voltage VP$_3$ depends upon the average overal value of the video output signal and this corresponds to so-called average light measuring mode in which the dark portion is used as the main object for pickup. Now with the value of the variable resistance $VR_1$ adjusted to infinity ($\infty$), the voltage doubling diode D is turned ON when applied with the minus portion of the signal $VP_1$ appearing at the output terminal $P_1$ to initiate charging of said capacitor C and then turned OFF with the subsequent plus portion of the signal $VP_1$ which is added to the voltage previously charged in said capacitor C so that the output signal $VP_2$ appearing at the point $P_2$ is subjected to DC restoration as seen in FIG. 6d. Variation in the amplitude of the signal $VP_1$ is detectable even when the width of the signal waveform corresponding to the bright portion is very small. The case where the variable resistance $VR_1$ is adjusted to infinity ($\infty$) corresponds to a so-called peak light measuring mode in which the bright portion is used as the main object for light measurement and reproduction. It will be obvious from the foregoing description that, when the variable resistance $VR_1$ takes an intermediate value, this resistance value limits the voltage with which said capacitor C can be charged and correspondingly the amplitude detectable when the width of the bright portion is reduced is also limited. Such condition corresponds to so-called intermediate light measuring mode. In other words, a light measuring condition having a limitation towards the peak mode is obtained when the maximum resistance value of the variable resistance $VR_1$ connected in parallel to said capacitor C is adjusted to a value near infinity while a light measuring condition having such a limitation towards the average mode is obtained when the variable resistance $VR_1$ is adjusted to a value near zero.

According to the present invention, there is provided in the reference voltage circuit 6 a variable resistance $VR_2$ for reference voltage correction in series with a reference voltage regulating variable resistance $VR_3$. The variable resistance $VR_2$ is operatively coupled with said variable resistance $VR_1$ of the voltage doubling capacitor C so that said correcting variable resistance $VR_2$ serves to lower the reference voltage $VP_4$ when the variable resistance $VR_1$ is adjusted towards the average light measuring mode ($VR_1=0$) while said correcting variable resistance $VR_2$ serves to raise the reference voltage $VP_4$ when said variable resistance $VR_1$ is adjusted towards the peak light measuring mode ($VR_1=\infty$).

Figure 2:
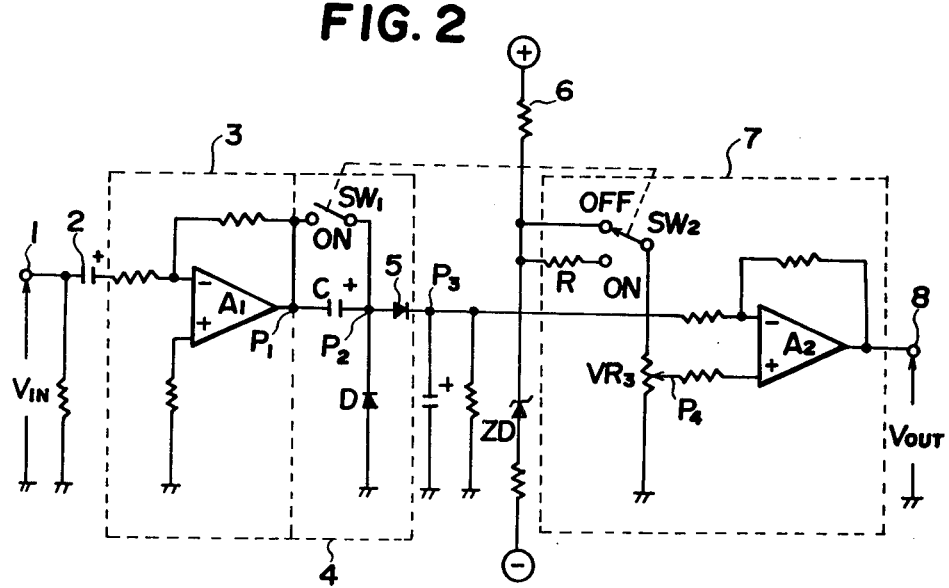
Figure 3:
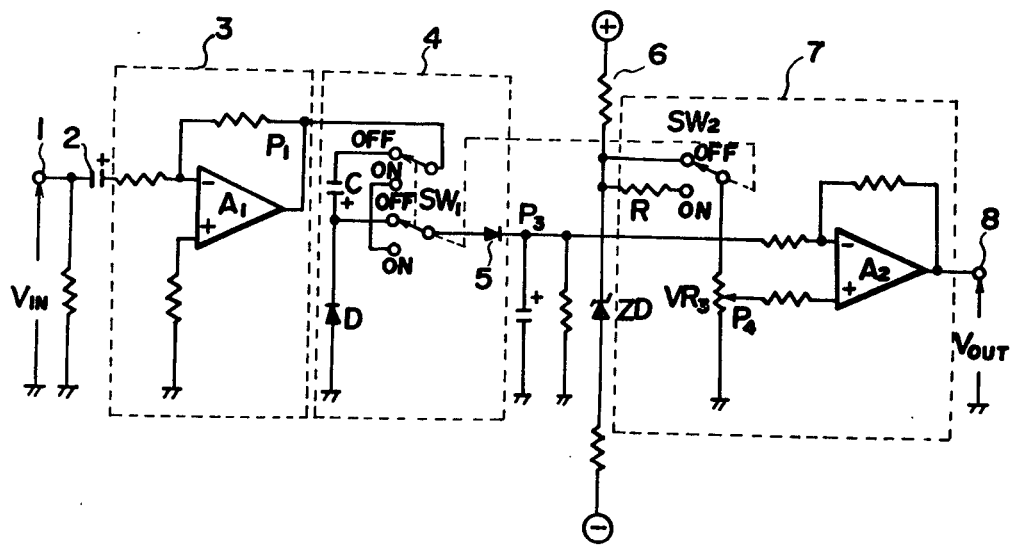

FIGS. 2 and 3 illustrate other embodiments of the present invention, wherein the variable resistance $VR_1$ in the previous embodiment of FIG. 1 is replaced by a switch $SW_1$ which is selectively turned ON and OFF in parallel to the voltage doubling capacitor C so that, then the switch $SW_1$ is turned ON to close a switching circuit between the points $P_1$, $P_2$ with respect to said capacitor C, the circuit condition corresponds to the average light measuring mode in which said variable resistance $VR_1$ takes the value of 0 and, when said switch $SW_1$ is turned off, the circuit condition corresponds to the peak light measuring mode in which said variable resistance $VR_1$ takes the value of infinity ($\infty$); and wherein there is provided in the reference voltage circuit 6 a correcting switch $SW_2$ in series with a reference voltage regulating variable resistance $VR_3$ coupled with said switch $SW_1$ so that, when said switch $SW_1$ is set to average light measuring (the side of ON), the switch $SW_2$ is moved to the position (the side of ON as seen in the figures) at which said switch $SW_2$ is conductively connected with the resistance R so as to lower the reference voltage $VP_4$ and, when said switch $SW_1$ is adjusted, inversely, to the side of peak light measuring (the side of OFF), said switch $SW_2$ is moved to the position (the side of OFF as seen in the figures) at which said switch $SW_2$ is not conductively connected with said resistance R so as to raise the reference voltage $VP_4$.

Figure 4:
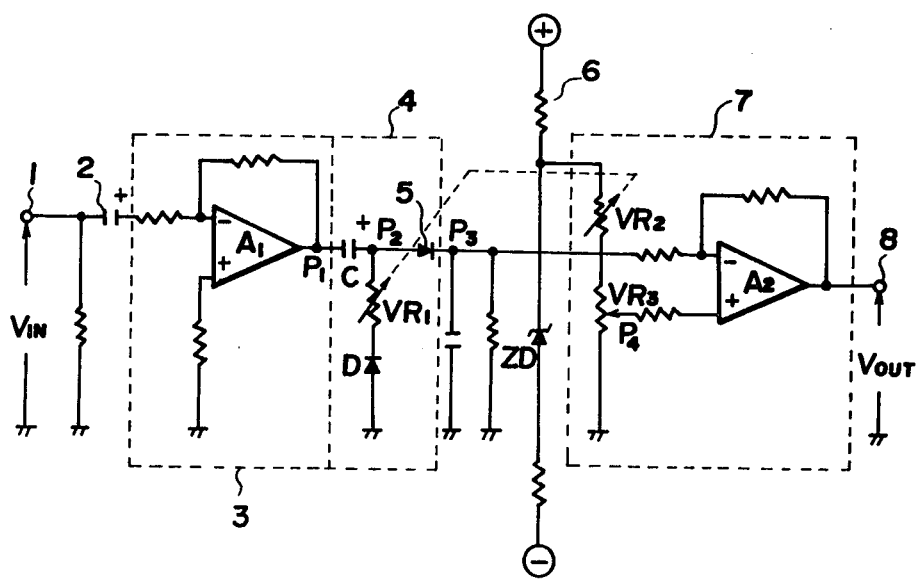

FIG. 4 illustrates still another embodiment of the present invention, wherein there is provided between the output terminal $P_2$ of the voltage doubling capacitor C and the voltage doubling diode D a variable resistance $VR_1$ so that, when the value of said variable resistance $VR_1$ is adjusted to 0, said diode is turned ON to provide the peak light measuring mode and, when the value of said variable resistance $VR_1$ is adjusted to infinity ($\infty$), said diode remains non-conductive so as to provide the average light measuring mode where the voltage doubling capacitor C is not charged with the minus portion of the signal $VP_1$ appearing at the point $P_1$. With the variable resistance $VR_1$ being adjusted to the intermediate value, the intermediate light measuring mode is obtained with respect to the average light measuring mode and the peak light measuring mode. As in the previous embodiment of FIG. 1, the variable resistance $VR_2$ in the reference voltage circuit 6 operates to lower the reference voltage $VP_4$ when the variable resistance $VR_1$ is set towards average light measuring ($VR_1=\infty$) and operates to raise said reference voltage $VP_4$ when said variable resistance $VR_1$ is set towards peak light measuring ($VR_1=0$).

FIG. 5 illustrates further another embodiment of the present invention, wherein the variable resistance $VR_1$ as shown in FIG. 4 is replaced by a switch $SW_1$ interposed between the output terminal of the capacitor C and the diode D so that, when said switch $SW_1$ is set to the conductive position (position OFF in FIG. 5), the peak light measuring mode is obtained and, when the switch $SW_1$ is set to the other position (position ON in FIG. 5) to place fixed resistance R in the circuit, the average light measuring mode is obtained, in which the charge voltage of the voltage doubling capacitor C is limited by the fixed resistance R. There is provided in the reference voltage circuit 6 a switch $SW_2$ adapted to be turned ON and OFF in synchronism with the switch $SW_1$ so that, when the switch $SW_1$ is set to average light measuring (the side of ON), the switch $SW_2$ is set to average light measuring (the side of ON as seen in FIG. 5) at which the switch $SW_2$ is conductively connected with the resistance $R_2$ so as to lower the reference voltage $VP_4$ and, when said switch $SW_1$ is set to peak light measuring (the side of OFF), said switch $SW_2$ is moved to the side (the side of OFF as seen in FIG. 5) at which the switch $SW_2$ is out of conductive connection with the resistance $R_2$ so as to raise the reference voltage $VP_4$.

As it will be obvious from the foregoing description, the present invention provides the automatic diaphragm control device for closed circuit television camera in which the video output signal coming from the television camera is applied to the polarity-inverting amplifier, then rectified by the voltage doubling rectifier and the DC voltage thereby obtained is compared with a separately provided reference voltage to form a diaphragm control signal, wherein the voltage with which the voltage doubling capacitor of the voltage doubling rectifier is charged is regulated by operating a variable resistance or a switch provided in parallel to said capacitor or by operating a variable resistance or a switch provided in series with the voltage doubling diode so that a desired changeover of said voltage doubling rectifier between the average light measuring mode and the peak light measuring mode is achieved. According to the teachings of the present invention, the reference voltage is adjusted to a low value for the average light measuring mode and to a relatively high value for the peak light measuring mode. Thus, the average is moderated for the average light measuring mode while the peak is moderated for the peak light measuring mode as indicated by the broken lines respectively associated with the solid lines in FIG. 9, so that the reference voltage can be substantially maintained constant even when changeover of the light measuring mode occurs under the condition of high contrast as in the natural world and the point at which the reference voltage level is substantially constant even when the light measuring modes are interchanged can shift from a cross point $X_1$ of the solid lines to a cross point $X_2$ of the broken lines in FIG. 9 to enlarge the effective range of light measuring.

Obviously it is also possible to arrange the device according to the present invention so that the variable resistance or the switch permitting the changeover of said voltage doubling rectifier between the average light measuring mode and the peak light measuring mode may be remote-controlled by known devices. Other modifications of the present invention will be also obvious to those of ordinary skill in the art. Such modifications are within the spirit and scope of the invention as claimed in the appended claims.

We claim:

1. A diaphragm control for a video camera producing a video output signal having bright signal portions and dark signal portions representative of bright and dark areas of the area monitored by said video camera, respectively, said control comprising:

input means for receiving said video output signal;

means for adjustably weighting said video output signal to vary the weight of said bright signal portions with respect to said dark signal portions, said means for adjustably weighting varying the average strength of said video output signal and producing a weighted signal therefrom;

reference signal generator means for producing a reference signal representative of desired average signal strength, said reference signal being varied in strength in order to compensate for variations in the average strength of said weighted signal produced by said means for adjustably weighting; and comparator means for producing a comparator output corresponding to the difference between said reference signal and the average strength of said weighted signal, said comparator output being used as a control signal for the camera diaphragm.

2. The control of claim 1 wherein said input means includes an inverting amplifier.

3. The control of claim 2 wherein said means for adjustably weighting said video output signal includes a voltage doubling means for selectively doubling the voltage of said video output signal.

4. The control of claim 3 wherein said voltage doubling means includes a switch for selectively by-passing said voltage doubling means to place said control in an average light measuring mode, said control being in a peak light measurement mode when said switch is open circuited.

5. The control of claim 4 wherein said voltage doubling means includes a variable resistance to variably select the enablement of said voltage doubling means to switch said control between an average light measuring mode and a peak light measurement mode.

6. The control circuit of claim 5 wherein said voltage doubling means includes a capacitor which, when charged, enables operation of said voltage doubling means;

said variable resistance being arranged in parallel with said capacitor to selectively prevent the charging of said capacitor.

7. The control circuit of claim 4 wherein said voltage doubling means includes a capacitor which, when charged, enables operation of said voltage doubling means;

said switch, when actuated, preventing said capacitor from charging.

8. The control circuit of claim 7 wherein said switch is remotely controlled.

9. The control circuit of claim 6 wherein said variable resistance is remotely controlled.

10. A diaphragm control for a video camera producing a video output signal having bright signal portions and dark signal portions representative of bright and dark areas of the area monitored by said video camera, respectively, said control comprising:

input means for receiving said video output signal;

inverting amplifier means coupled to said input means for inverting said video output signal to form an inverted output signal;

voltage doubling means for selectively doubling the voltage of said inverted output signal to produce voltage doubler output;

means for averaging said voltage doubler output to produce a DC voltage control signal;

means for comparing said DC voltage control signal with a reference voltage to generate a control signal for the camera diaphragm;

said voltage doubling means varying the weight of said bright signal portions with respect to said dark signal portions of said inverted output signal and also varying the average strength of said video inverted output signal; and means for varying said reference voltage in order to compensate for variations in the average strength of said voltage doubler output.

11. The control of claim 10 wherein said voltage doubling means includes a switch for selectively by-passing said voltage doubling means to place said control in an average light measuring mode, said control being in a peak light measurement mode when said switch is open circuited.

12. The control circuit of claim 11 wherein said voltage doubling means includes a capacitor which, when charged, enables operation of said voltage doubling means;

said switch, when actuated, preventing said capacitor from charging.

13. The control of claim 10 wherein said voltage doubling means includes a variable resistance to variably select the enablement of said voltage doubling means to switch said control between an average light measuring mode and a peak light measurement mode.

14. The control circuit of claim 13 wherein said voltage doubling means includes a capacitor which, when charged, enables operation of said voltage doubling means;

said variable resistance being arranged in parallel with said capacitor to selectively prevent the charging of said capacitor.

15. The control circuit of claim 12 wherein said switch is remotely controlled.

16. The control circuit of claim 14 wherein said variable resistance is remotely controlled.

* * * * *